July 16, 1963 H. C. VAN ROSSUM ETAL 3,098,179

SIGNALLING RECEIVER

Filed March 12, 1959

INVENTORS
HENDRIKUS CORNELIS VAN ROSSUM
CARLOS VILLALAZ

BY

Frank R. Jifari

AGENT

United States Patent Office 3,098,179
Patented July 16, 1963

3,098,179

SIGNALLING RECEIVER

Hendrikus Cornelis van Rossum, Hilversum, Netherlands, and Carlos Villalaz, Zuerich, Switzerland, assignors to North American Philips Company, Inc., New York, N.Y., a corporation of Delaware Filed Mar. 12, 1959, Ser. No. 798,886
Claims priority, application Netherlands Apr. 3, 1958
8 Claims. (Cl. 317—147)

This invention relates to a signalling receiver for the reception of signalling pulses at a frequency lying within the speech band, generally within the higher speech frequency band of, for example, from 200 c./s. to 3000 c./s., the received oscillations being supplied to a first channel, which contains a filter which passes the signalling frequency, and also to a second channel (rejector circuit), which passes all oscillations with the exception of the signalling frequency, while the signalling receiver further contains a signalling relay stage which is controlled by the output voltage of the first channel and by the voltage of the second channel which is rectified in an amplitude detector stage and is supplied to the signalling relay stage as a blocking voltage. Such signalling receivers for within-the-band signalling can be used to advantage in carrier wave telephony systems.

It has been found that in such a signalling receiver for within-the-band signalling the second channel (rejector circuit) does not provide complete protection against the signalling relay responding to speech frequencies. Even if the selectivity of the filters in the inputs of the first and second channels is increased, it was found that in continuous operation for 100 hours the signalling relay responded from 10 to 20 times to the speech frequencies, and for various applications this is too high since as a result the speech connection may be interrupted. An incidental disadvantage of the increase of the selectivity of the filters consists in that the signalling pulses are materially distorted.

It is an object of the present invention to provide an arrangement of the kind described in the preamble, in which the response of the signalling relay to speech frequencies is materially reduced, for example by a factor 20, by simple means.

According to the invention, for this purpose a limiter is connected between the filter in the first channel, which passes the signalling frequency, and the signalling relay stage.

Preferably the limiting level of the limiter lies about 10 db below the nominal level of the speech signals supplied to the signalling receiver.

According to a further feature of the invention, whilst retaining a high insensitiveness of the signalling receiver to speech frequencies, distortions in the signalling pulses are materially reduced in that there is connected to the filter in the first channel which passes the signalling frequencies a non-linear damping resistor the value of which decreases with increase in the voltage.

Figure 1:
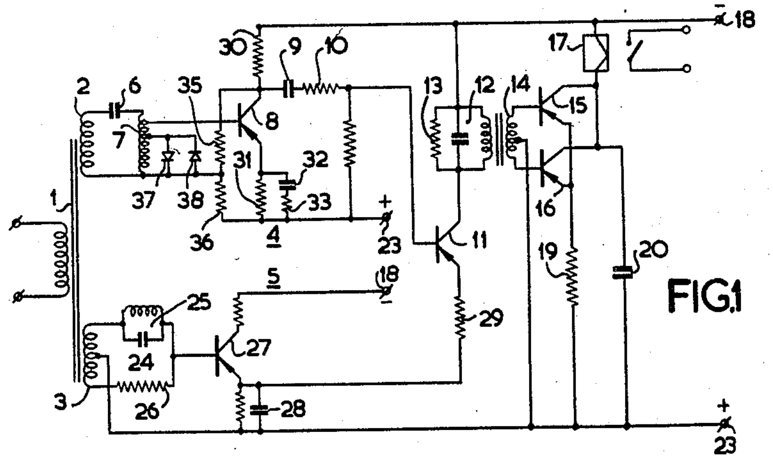

In order that the invention may readily be carried out, an embodiment thereof will now be described, by way of example, with reference to the accompanying diagrammatic drawings, in which:

FIG. 1 is a circuit diagram of a signalling receiver in accordance with the invention, and FIGS. 2*a*–2*c* show a few voltage diagrams illustrating the signalling receiver shown in FIG. 1.

In the signalling receiver of FIG. 1, the speech signals of from 300 c./s. to 3400 c./s. and signalling signals at a frequency of, say, 3000 c./s. are supplied, if required after amplification, through a transformer 1 having two secondary windings 2, 3 to channels 4 and 5. The nominal level of the signalling pulses is about 3 to 6 db lower than the nominal speech level.

The channel 4 contains a filter which passes the signalling frequency of 3000 c./s. and is designed as a series circuit 6, 7, there being connected to the series-circuit coil 7 a transistor 8 which will be described more fully hereinafter and which is connected, through a series capacitor 9 and a series resistor 10, to a signalling relay stage. The signalling relay stage comprises a transistor 11 designed as an amplifier for operation in class B, the collector of this transistor being connected to a circuit 12, which is tuned to the signalling frequency and damped by a parallel resistor 13, the tuned circuit 12, 13 being coupled, through a coupling coil 14 to two transistors 15 and 16 which are connected for operation in class B, both the collector electrodes and the emitter electrodes being connected to one another. The collector electrodes are connected, through the energizing winding of a signalling relay 17, to a negative terminal 18 of a voltage supply battery and also, through a smoothing capacitor 20, to a positive terminal 23 of the voltage supply battery, while a negative feedback resistor 19 is connected in the emitter circuit of the transistors 15, 16. If, in the arrangement described, a frequency corresponding to the signalling frequency of 3000 c./s. is supplied to the primary winding of the input transformer 1, this 3000 c./s. frequency is supplied, through the filter 6, 7 and the transistors 8, 11, to the damped circuit 12, 13, the collector currents of the transistors 15, 16 increasing by rectification in these transistors so that the signalling relay 17 responds.

In order to prevent the signalling relay 17 from responding to speech frequencies, the secondary 3 of the transformer is connected to a second channel 5 (rejector circuit) through a filter 24 which passes all oscillations with the exception of the signalling frequency of 3000 c./s. The filter 24 is designed as a bridge circuit, one bridge arm comprising a parallel circuit 25 tuned to the signalling frequency of 3000 c./s., while the other bridge arm comprises a resistor 26 proportioned so that the bridge is balanced for the signalling frequency and no voltage is transmitted by the filter 24. If, however, the frequency applied to the filter 24 deviates from this signalling frequency, there is taken from the filter 24 a voltage which is amplified in a transistor 27 and detected so that in the emitter circuit 28 a rectified voltage is produced which is applied, through a series resistor 29, to the emitter circuit of the transistor 11 as a blocking voltage. Thus the transistor 11 is blocked at the occurrence of a speech signal, so that speech signal frequencies corresponding to the signalling frequency of 3000 c./s. cannot reach the transistors 15, 16 through the channel 4. However, in spite of the rejector circuit 5 the signalling receiver still responds from 10 to 20 times to the speech frequencies in continuous operation for one hundred hours.

It has now been found that the response of the signalling receiver to speech frequencies occurs particularly at high speech intensities, so that the probability W of the signalling receiver responding to speech frequencies, when plotted as a function of the speech intensity I, has the variation shown in FIG. 2*a* by a curve *a* and, as will be seen from this figure, the probability W of the signalling receiver responding to speech frequencies suddenly increases progressively beyond a certain speech intensity towards the higher speech intensities. This nature of the probability curve *a* is due to the fact that, when the speech intensity I is increased, the intensity of the higher speech frequencies is found to increase more than proportionally to the total speech intensity, for the voltage supplied by the rejector circuit 5 for blocking the transistor 11 is no longer sufficient to reject the speech frequencies passed by the filter 6, 7, so that the signalling relay 17 responds to these speech frequencies.

In accordance with the above-described theory, the signalling relay 17 is materially prevented from responding to speech frequencies by the provision, in the first channel 4, of a limiter between the filter 6, 7 and the transistor 11. In the embodiment described, the limiter comprises the transistor 8 which, in order to ensure the required amplification in the signalling receiver, also acts as an amplifier. In the arrangement described, the base electrode is connected to a tapping on the circuit coil 7, the collector of the transistor 8 being connected, through a resistor 30, to the negative terminal 18 of the voltage supply battery. The emitter circuit contains the series combination of a capacitor 32 and a resistor 33, which combination is shunted by a resistor 31, the supply voltage for the base being taken from a voltage divider 35, 36 connected between the collector and the positive terminal 23 of the voltage supply battery. By suitable proportioning of the components connected to the transistor, the limiting level of the transistor 8, which acts as a limiter and also as an amplifier, can be adjusted to a desired value $p$.

Owing to the use of the limiting transistor 8 in the first channel 4, the speech frequencies corresponding to the signalling frequency of 3000 c./s. can only increase to the limiting level $p$ with increase in the speech intensity, whereas the blocking voltage from the rejector circuit 5 increases in proportion to the speech intensity. The probability curve which shows the probability W of the signalling receiver responding to speech frequencies as a function of the speech intensity I, now will have the variation shown by the curve $b$ of FIG. 2$a$, this probability increasing with increase in the speech intensity to a certain maximum value and subsequently decreasing rapidly. Thus the signalling receiver response is materially reduced, for example, if the limiting level of the transistor 8 lies at least 10 db below the nominal level of the speech signals supplied to the channel 4, the signalling receiver only responds to speech frequencies less than once in continuous operation for one hundred hours.

In the signalling receiver hitherto described, which is provided with within-the-band signalling, owing to the high selectivity of the filter 6, 7 distortions occur in the signalling pulses reproduced by the signalling relay. The bases of the signalling pulses transmitted through the transistor 8 to the signalling relay stage are widened in the selective filter 6, 7 owing to the decay phenomenon, the width increasing with increase in the intensity of the signalling pulses. This is illustrated in the time diagram of FIG. 2$b$ by two trains of signalling pulses $m$ and $n$ of different amplitudes which are taken from the selective filter 6, 7, the bases of these pulses, which lie within the limiting level indicated by the horizontal lines $p$, being supplied to the signalling relay stage. In order to show clearly the pulse distortion which depends upon the intensity of the received signalling pulses, in FIG. 2$b$ the signalling pulses $m$ and $n$ are drawn one within the other.

Whilst retaining the high insensitiveness to speech frequencies, the shown distortions of the signalling pulses in the signalling receiver described are materially reduced in a simple manner by connecting to the filter 6, 7 in the first channel, which passes the signalling frequencies, a non-linear damping resistor the value of which decreases with increase in the voltage. In the embodiment shown, the non-linear damping resistance comprises two diodes 37, 38 which are connected in opposite senses to a tapping on the circuit coil 7.

In the signalling receiver described, with high intensity of the oscillations set up in the resonant circuit 6, 7 the selectivity will be reduced by the damping resistance 37, 38, so that especially the widening of the signalling pulses received with high intensity is materially reduced. This does not interfere with the insensitiveness of the signalling receiver to speech frequencies, since particularly at the high speech intensities the insensitiveness of the signalling receiver to speech frequencies has a maximum value as is illustrated by the curve $b$ in FIG. 2$a$.

Figure 2:
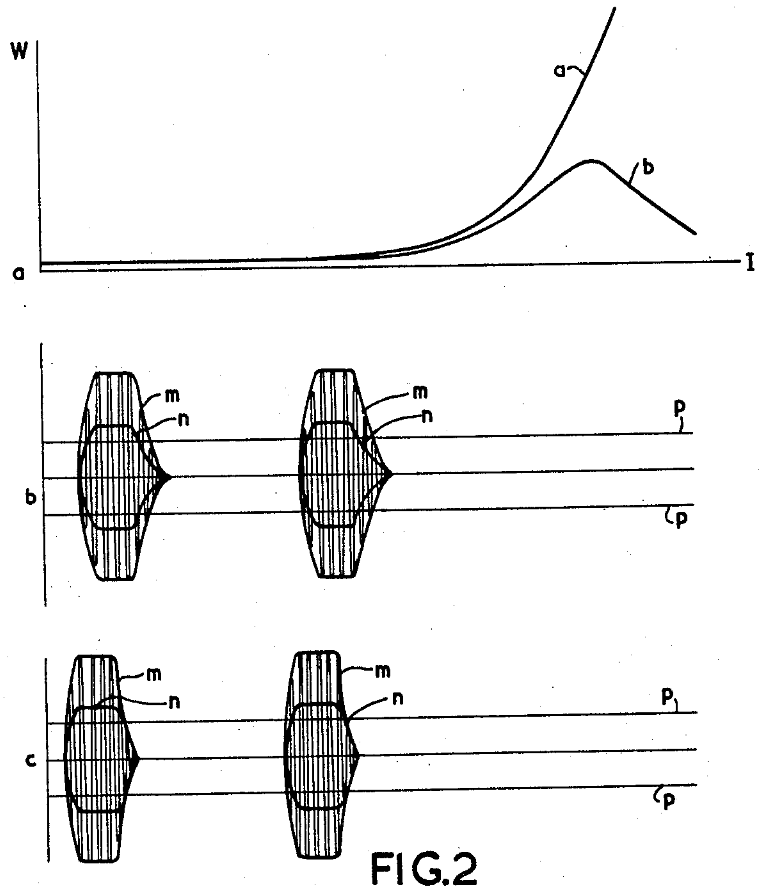

FIG. 2$c$ shows the shape of the signalling pulses taken from the filter 6, 7 as a time diagram and, as will be seen from this figure, distortions in the signalling pulses reproduced are materially reduced.

Thus, with the use of the steps described a signalling receiver is obtained which distinguishes itself by a high-quality reproduction of the signalling pulses and a high insensitiveness to speech frequencies, for example, it was found that in continuous operation for one hundred hours the signalling receiver only responded about once to speech frequencies.

What is claimed is:

1. A signal receiver for the reception of signal pulses of oscillations of a given frequency, said given frequency being within a frequency band of other signals, said receiver comprising first and second channels, means applying said pulse signals and other signals to said channels, said first channel comprising frequency selective means for passing only signals of said given frequency, said second channel comprising means rejecting signals of said given frequency, signal relay means, means applying the output of said first channel to said relay means to effect the operation of said relay means upon the occurrence of said signal pulses, said last-mentioned means comprising a transistor having an input electrode connected to the output of said first channel and an output electrode connected to said relay means, rectifier means connected to said second channel to provide a rectified output, means applying said rectified output to said transistor to block the operation thereof, and means for limiting the amplitude of the signal pulses applied from said first channel to said transistor.

2. A signal receiver for the reception of pulses of oscillations of a given frequency within a band of signal frequencies, comprising an input circuit, means applying signals of said band of frequencies to said input circuit, frequency selective filter means connected to said input circuit for providing a first output of signals of said given frequency, frequency rejection filter means connected to said input circuit for providing a second output in which signals of said given frequency are rejected, signal relay means, means operatively applying said first output to said signal relay means, said last-mentioned means comprising a transistor having an input electrode and an output electrode, means applying said first output to said input electrode, means connecting said output electrode to said signal relay means, detector means connected to said frequency rejection filter means for providing a rectified output, means applying said rectified output to said transistor to block the operation thereof, and limiter means connected to limit the amplitude of said first output signals applied to said signal relay means.

3. A signal receiver for the reception of pulses of oscillations of a given frequency within a band of signal frequencies, comprising an input circuit, means applying signals of said band of frequencies to said input circuit, frequency selective filter means connected to said input circuit for providing a first output of signals of said given frequency, frequency rejection filter means connected to said input circuit for providing a second output in which signals of said given frequency are rejected, an amplifier-limiter circuit comprising a first transistor having base, collector and emitter electrodes, means connecting said base electrode to said frequency selective filter means, resistance means connected in the emitter and collector circuits of said transistor, a voltage divider connected between said collector electrode and emitter circuit, means connecting said frequency selective filter means to said voltage divider to provide bias for said first transistor, signal relay means, a second transistor having an input electrode, and an output electrode, means for biasing said second transistor, means connecting said collector electrode to said input electrode, means for connecting said output electrode to said signal relay means, detector means connected to said frequency rejection filter means for providing a rectified output, and means for applying said rectified output to said biasing means to block the conduction of said second transistor.

4. A signal receiver for the reception of signal pulses of oscillations of a given frequency, said given frequency being within a frequency band of other signals, said receiver comprising first and second channels, means applying said pulse signals and other signals to said channels, said first channel comprising a series circuit, an inductor and capacitor resonant at said given frequency, non-linear damping resistor means connected in parallel with at least a portion of said inductor, limiter means having an input circuit connected to said inductor and an output circuit, and a transistor having an input electrode and an output electrode, means for biasing said transistor, said second channel comprising means rejecting signals of said given frequency and means for providing a rectified output, means applying said rectified output to said biasing means to block the condition of said transistor, signal relay means, and means connecting said output electrode to said signal relay means.

5. The receiver of claim 2, in which the limiting level of said limiter means is substantially below the nominal level of signals applied to said receiver.

6. The receiver of claim 2, comprising non-linear damping resistor means connected to the output of said frequency selective filter means.

7. The receiver of claim 3, comprising non-linear damping resistance means connected to variably damp said frequency selective filter means, the resistance of said resistance means decreasing with increases in voltage applied thereto.

8. The receiver of claim 7, in which said non-linear resistance means comprises two parallel connected diodes connected for current flow in opposite directions.

References Cited in the file of this patent

UNITED STATES PATENTS

| | | |
|---|---|---|
| 2,122,748 | Mayer | July 5, 1938 |
| 2,231,174 | Trogner | Feb. 11, 1941 |
| 2,698,878 | Martens | Jan. 4, 1955 |
| 2,838,613 | Ribeyre | June 10, 1958 |
| 2,883,474 | Fritschi | Apr. 21, 1959 |